United States Patent [19]
Takeuchi et al.

[11] Patent Number: 5,389,472
[45] Date of Patent: Feb. 14, 1995

[54] PREPARATION OF SILVER VANADIUM OXIDE CATHODES USING AG (O) AND $V_2O_5$ AS STARTING MATERIALS

[75] Inventors: Esther S. Takeuchi, Williamsville; William C. Thiebolt, III, Tonawanda, both of N.Y.

[73] Assignee: Wilson Greatbatch Ltd., Clarence, N.Y.

[21] Appl. No.: 71,518

[22] Filed: Jun. 3, 1993

[51] Int. Cl.$^6$ .................. H01M 4/04; H01M 4/54
[52] U.S. Cl. .................... 429/219; 264/104; 252/518; 423/23; 423/62; 423/593
[58] Field of Search .............. 264/104; 423/23, 62, 423/593; 23/293 R; 429/219; 252/518

[56] References Cited

U.S. PATENT DOCUMENTS

| | | | |
|---|---|---|---|
| 4,310,609 | 1/1982 | Liang et al. | 429/194 |
| 4,830,940 | 5/1989 | Keister et al. | 429/194 |
| 4,965,151 | 10/1990 | Takada et al. | 429/191 |
| 5,221,453 | 6/1993 | Crespi | 204/291 |

FOREIGN PATENT DOCUMENTS

| | | |
|---|---|---|
| 0478303 | 1/1992 | European Pat. Off. |
| 2065957A | 8/1981 | United Kingdom ............ 423/219 |

OTHER PUBLICATIONS

K. Takada et al., *Solid State Ionics* 40/41:1990; Rechargeable Solid-State Batteries With Silver Ion Conductors; pp. 988–992.

K. Takada et al., *Eur. J. Solid State Inorg. Chem.* 1991, pp. 533–545; Electrochemical Stuides On Silver Vandium Bronzes; pp. 533–545.

*Primary Examiner*—Kathryn Gorgos
*Attorney, Agent, or Firm*—Hodgson, Russ, Andrews, Woods & Goodyear

[57] ABSTRACT

A method for preparing a cathode having as active material silver vanadium oxide formed by chemical addition, reaction or otherwise intimate contact of elemental silver and a vanadium-containing compound present in an anhydrous mixture, is described. The present invention provides alternate preparation techniques for improving chemical control in the formation of a cathode for incorporation into an electrochemical cell.

20 Claims, 5 Drawing Sheets

PREPARATION OF SILVER VANADIUM OXIDE CATHODES USING AG (O) AND $V_2O_5$ AS STARTING MATERIALS

BACKGROUND OF THE INVENTION

1. Field of the Invention

This invention relates to the manufacture of an alkali metal electrochemical cell or battery, and more particularly to new and improved methods of preparing silver vanadium oxide composite cathode material for use in high energy density batteries.

2. Prior Art

Solid cathode, liquid organic electrolyte alkali metal or lithium anode cells or batteries are used as the power source for implantable medical devices. The cathode of such a cell may have as active material carbon fluoride, a metal oxide, a mixed metal oxide such as silver vanadium oxide, or other suitable material as disclosed in U.S. Pat. No. 4,830,940 to Keister et al., which patent is assigned to the assignee of the present invention and is incorporated herein by reference.

Preparation of cathode material containing a metal oxide such as silver vanadium oxide ($AgO_2V_{5.5}$, SVO) for use in a lithium cell or battery has been known by a decomposition reaction. However, the decomposition method of preparation is accompanied by the evolution of gaseous products. Typically, the synthesis is carried out by first thermally decomposing a vanadium salt to produce vanadium pentoxide. A decomposable metal salt, preferably containing silver, is then blended with the vanadium pentoxide and the mixture is oven-dried. Following drying, the mixture is again blended and ground to ensure thorough intermingling of the constituents and the resulting homogeneous mixture is subsequently baked for a final heating/decomposition period. Depending on the starting materials used, this final heating/decomposition period can result in the release of toxic by-product gases. For example, if silver nitrate ($AgNO_3$) is used as the silver source, nitrous oxide type gases may be formed. Such a decomposition reaction for the preparation of silver vanadium oxide is:

$$AgNO_3 + V_2O_5 \rightarrow AgV_2O_{5.5} + NO_2 + \tfrac{1}{4}O_2$$

Upon cooling, the baked material is blended with appropriate amounts of carbon black and graphite powder to enhance conductivity, and with a binder material, and then pressed to form the cathode. Such a method is described in more detail in U.S. Pat. No. 4,310,609, to Liang et al., which patent is assigned to the assignee of the present invention and is incorporated herein by reference.

Accordingly, the present invention provides an alternate preparation method for silver vanadium oxide by chemical addition, reaction, or otherwise intimate contact of a silver-containing component with a vanadium-containing compound to form a mixed metal oxide. One such method of the present invention comprises intimately combining elemental silver Ag(0) with vanadium pentoxide $V_2O_5$ in about a 1:1 mole ratio followed by thermal treatment of the mixed metal oxide to produce an oxygen deficient silver vanadium oxide product.

The addition reaction may be carried out at temperatures of from between about 300° C. to 700° C., preferably at temperatures of between about 350° C. to 550° C., and most preferably at temperatures of between about 380° C. to 400° C. and may proceed to completion within about 2 to 22 hours. Lower temperatures require a longer reaction time. Longer reaction times and higher temperatures may lead to diminished rate capability in cells utilizing the silver vanadium oxide material due to undesirable grain growth. Therefore, in general, lower temperatures are preferred in order to limit grain growth in the silver vanadium oxide product. The reaction is preferably carried out in an oxidizing atmosphere that can include air and oxygen, or the reaction may be carried out in an inert atmosphere including for example argon, nitrogen and helium. In addition, the reaction is carried out in a manner so as to provide a preselected desired shape in the electrical discharge characteristics of the electrochemical cell having a cathode containing the silver vanadium oxide material.

References related to the art of thermal treatment of silver and vanadium containing compound mixtures include:

K. Takada et al. "Eur. J. Solid State Inorg. Chem.", 28:533–545, 1991, and K. Takada et al. "(Solid State Ionics 40/41:988–992, 1990, and U.S. Pat. No. 4,965,151 to Takada et al., which describe the snythesis of silver vanadium oxides prepared by mixing powdered silver and vanadium pentoxide heated under vacuum in a sealed quartz tube. As shown in FIG. 1, heating the starting ingredients under vacuum gives a much different material than that formed by the method of the present invention (FIG. 2), as evidenced by the X-ray diffraction patterns. FIG. 1 shows X-ray powder diffraction data from silver vanadium oxide made according to Takada under vacuum and at various ratios of silver to vanadium. In comparison, FIG. 2 is a compilation of actual patterns plotted as intensity percent (I%) versus the X-ray diffraction angle (2θ), wherein Ar is derived from silver oxide ($Ag_2O$) and vanadium oxide ($V_2O_5$) combined under argon for 24 hours at 375° C. for a final stoichiometry of $Ag_{0.7}V_2O_x$; Amb is derrived from silver oxide and vanadium oxide combined under ambient atmosphere at 375° for a final ratio of $Ag_{0.7}V_2O_x$; Ag is derived from silver metal and vanadium oxide combined at 600° C. under argon for 48 hours for a final ratio of $Ag_{0.7}V_2O_x$; and $AgNO_3$ is derived from silver nitrate and vanadium oxide combined in water and then baked for 16 hours at 375° under ambient atmosphere for a final composition of $Ag_{0.7}V_2O_x$.

Published European patent application 0 478 302 A2 discloses silver vanadium oxide cathode material for electrochemical cells and prepared by a chemical combination or addition reaction, but it does not disclose carrying out the reaction in a manner so as to provide a preselected desired shape for the electrical discharge characteristics of the electrochemical cell having a cathode containing the silver vanadium oxide.

It is, therefore, an object of this invention to provide new and improved methods for preparing a silver vanadium oxide composite cathode for use in high energy density batteries.

It is a further object of this invention to provide improved chemical control for the formation of mixed metal oxide cathode material.

It is still another object of this invention to provide new and improved methods for preparing silver vanadium oxide using elemental silver powder and $V_2O_5$ as starting materials.

SUMMARY OF THE INVENTION

The present invention relates to a new and improved method of preparing silver vanadium oxide composite cathode material for use in high energy density batteries. The present invention comprises a cathode formed from materials that include silver vanadium oxide prepared by the thermal treatment of anhydrous formations in mixed metal states, and may include an electronic conductor and binder materials. The silver vanadium oxide composite material prepared by the method of the present invention results in the intercalation of silver ions into starting materials comprising one or more vanadium-containing compounds through intimate contact of silver powder with the vanadium-containing compound, followed by thermal treatment wherein a mixed metal oxide is formed. Such vanadium-containing compounds include, but are not limited to, vanadium oxide salt, silver vanadate, polyvanadic acid and vanadium oxides. The use of elemental silver avoids the liberation of toxic fumes generated by use of silver nitrate, as in the previously discussed decomposition method. The foregoing is carried out in a manner, for example by varying the silver content of the starting material, so as to provide a preselected desired shape in the electrical discharge characteristic of the electrochemical cell containing the silver vanadium oxide composite cathode material.

Cathode plates can be formed by an entirely dry pressing procedure thereby enhancing the shelf life of the resulting plates. Alternatively, the procedure can include dropwise addition of liquid electrolyte to the cathode mixture prior to pressing to enhance the performance and discharge rate capability of an assembled cell incorporating the cathode.

BRIEF DESCRIPTION OF THE DRAWINGS

The above and other objects, features, and advantages of the present invention will be apparent in the following detailed description of the preferred embodiments taken in conjunction with the accompanying drawing, in which.

DETAILED DESCRIPTION OF THE INVENTION

The method of the present invention comprises synthesizing silver vandium oxide from starting materials including elemental silver powder and vanadium pentoxide ($V_2O_5$). This method comprises combining the starting materials by thoroughly grinding them together to ensure homogeneity and thermally treating the ground mixture. A cathode for a high energy density battery is then formed by combining the silver vanadium oxide mixture with an electronic conductor and binder materials, and finally pressing the composite materials to form a cathode plate. This synthesis avoids the liberation of toxic fumes generated by use of silver nitrate as the silver starting material.

A cathode, containing cathode active material prepared by the method of the present invention, can be used in a non-aqueous U.S. Pat. No. 4,830,940 to Keister et al. lithium battery as described by, wherein the battery also contains an alkali metal anode, preferably lithium or alloys thereof; a nonaqeuous electrolyte which preferably is comprised of a combination of lithium salt and an organic solvent; and a separator material electrically insulating the anode from the cathode while having sufficient porosity to allow for electrolyte flow.

Figure 1:
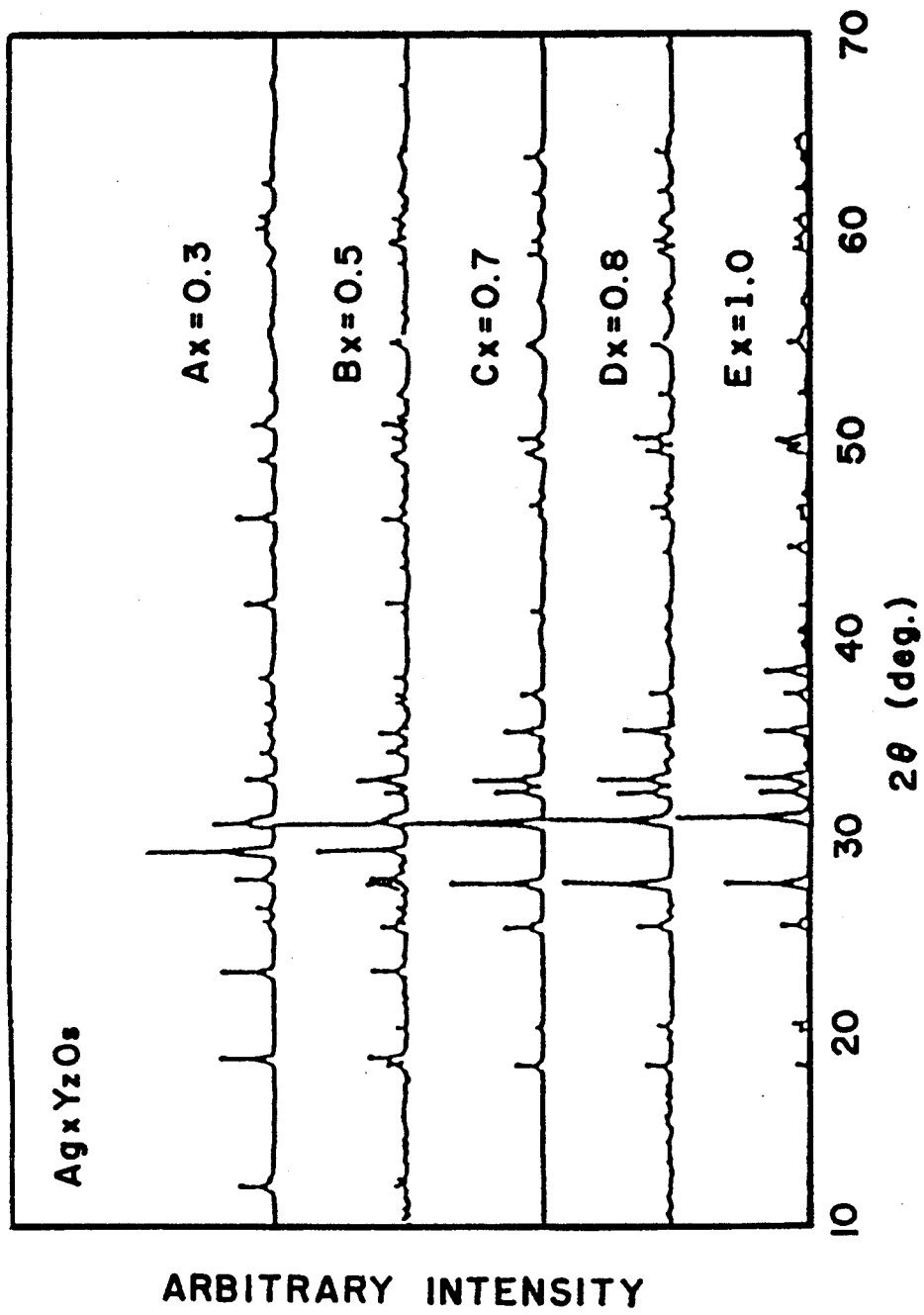
FIG. 1 is a set of X-ray diffraction patterns of a silver vanadium oxide cathode material made according to the prior art.
Figure 2:
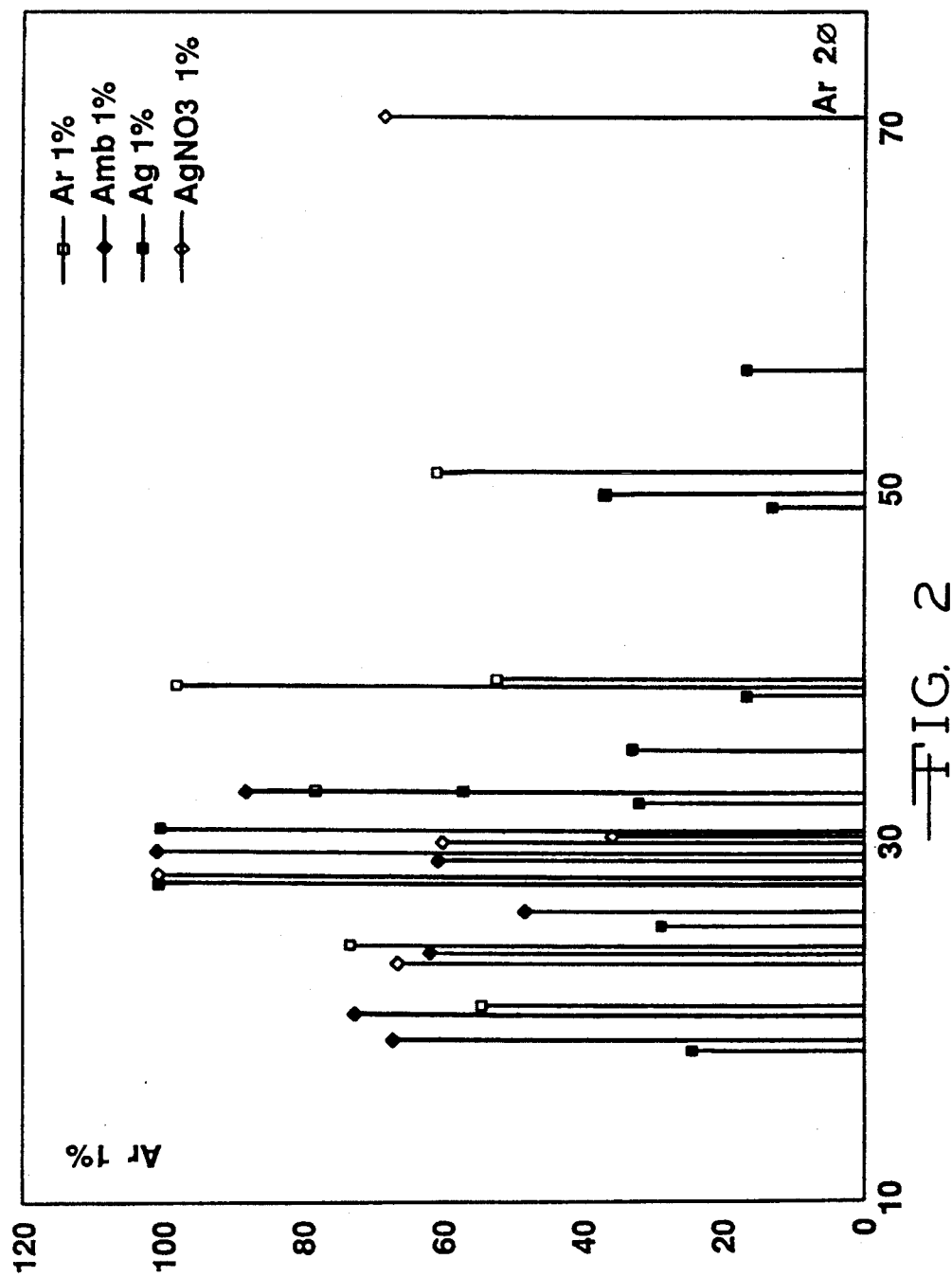
FIG. 2 is a compilation of diffraction patterns plotted as intensity percent for silver vanadium oxide according to the methods of the present invention.
Figure 3:
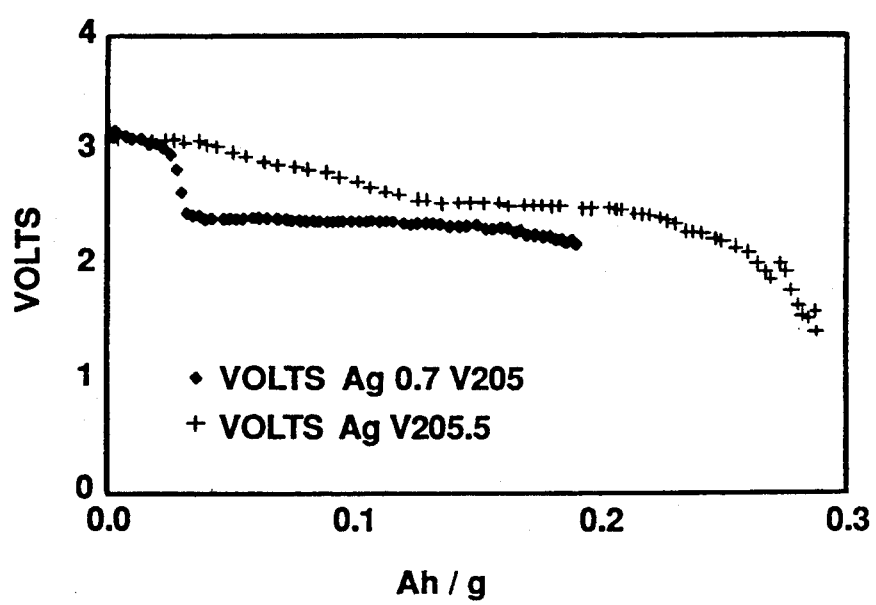
FIG. 3 is a graph showing the discharge curves of electrochemical cells containing silver vanadium oxide as a cathode made from $AgNO_3$ and $V_2O_5$ according to the prior art decompostion method and made from silver powder and vanadium oxide in accordance with the present invention.

An important aspect of the method of the present invention is that it can be carried out in a manner so as to provide a preselected desired shape in the electrical discharge characteristic of the electrochemical cell containing the vanadium oxide composite cathode material. One way of accomplishing this is by varying the silver content of the starting materials. FIG. 3 illustrates the tailoring effect of a discharge curve through manipulation of the silver content of the starting materials, wherein discharge curve 10 exhibits a step shape and is derived from a high energy density cell containing silver vanadium oxide as a cathode made from $AgNO_3$ according to the prior art decomposition method. As previously mentioned, this material has a stoichiometric composition of $AgV_2O_{5.5}$. Curve 20 has a plateau shape and was derived from a high energy density cell having silver vanadium oxide made from an addition reaction of silver powder as the silver-containing compound intimately combined with a vanadium-containing compound, followed by thermal treatment to synthesize an oxygen deficient silver vanadium oxide having the stoichiometric composition $Ag_{0.7}V_2O_5$, and without the undesirable toxic by-product gases characteristic of the prior art decomposition method. The difference in the shape of the stepped-shaped discharge curve 10 and the plateau shaped discharge curve 20 shows that by stoichiometrically varying the amount of silver to vanadium present in the mixed metal oxide product, the shape of the resulting discharge curve can be manipulated. Even though the silver content of the present invention is lower than the silver vandium oxide produced by the decomposition method, this is not a necessity.

Figure 4:
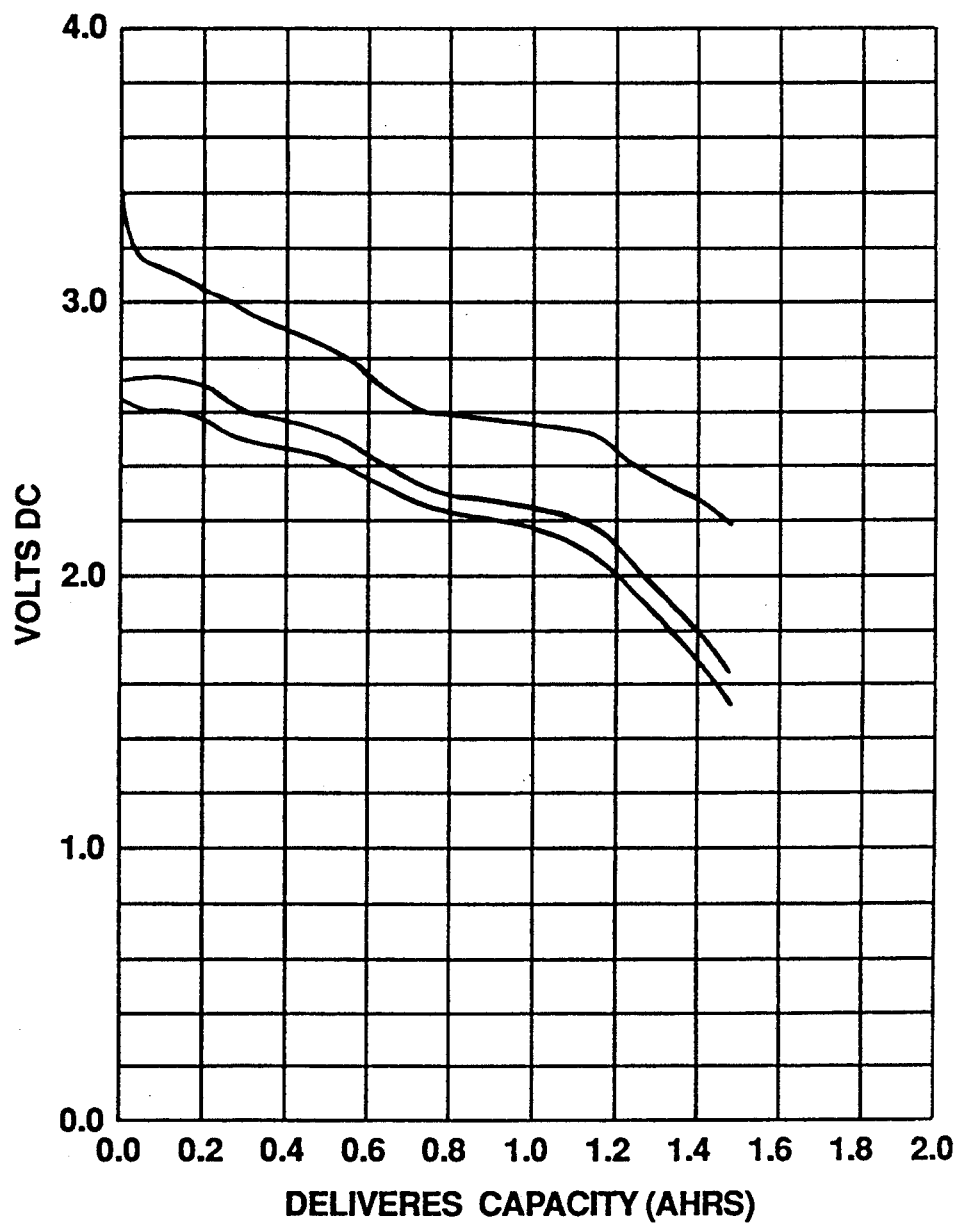
FIG. 4 is a graph showing the discharge curves of a newly assembled cell containing a silver vanadium oxide cathode material produced by the chemical combination or addition reaction of $AgNO_3$ and $V_2O_5$ in accordance with one of the methods of the present invention and in an inert argon atmosphere.
Figure 5:
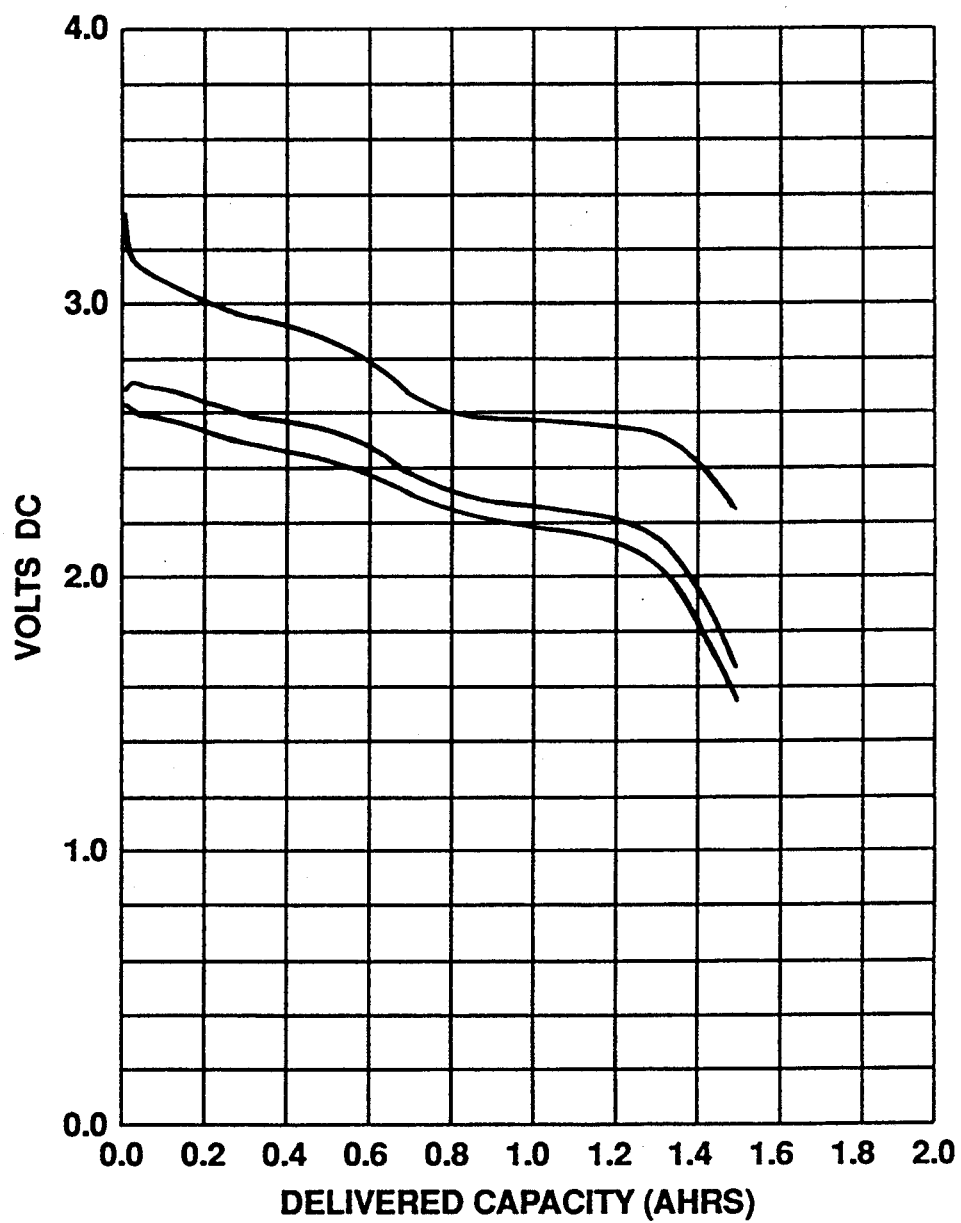
FIG. 5 is a graph showing the discharge curves of a newly assembled cell containing a cathode produced by the chemical combination or additional reaction of $AgVO_3$ and $V_2O_5$ in accordance with the present invention and in an oxidizing atmosphere.

FIGS. 4 and 5 show discharge curves for comparative high energy density cells containing silver vanadium oxide made according to the methods of the present invention, but under varying atmospheres. The discharge curves were recorded by applying pulse trains consisting of four ten-second, 1.5 ampere pulses every 15 seconds repeated every 30 minutes to the cells. Thus, FIG. 4 shows silver vanadium oxide made by an addition reaction of a silver-containing component and a vanadium-containing compound under an argon atmosphere wherein curve 30 was recorded at open circuit with no load, curve 32 was constructed from the minima of the first pulse of each train and curve 34 was constructed from the minima of the fourth pulse of each train. In comparison, FIG. 5 shows a silver vanadium oxide made by an addition reaction under an oxygen atmosphere wherein curve 40 was recorded at open circuit with no load, curve 42 constructed from the minima of the first pulse of each pulse train and curve 44 was constructed from the fourth pulse minima of each pulse train. The end of life shape of the respective cells is different with the inert argon atmosphere exhibiting a more flattened and stretched out shape than the cathode material produced in a oxidizing atmosphere having, a much sharper drop-off. Additional suitable inert atmospheres include nitrogen and helium in addition to argon while suitable oxidizing atmospheres include air in addition to oxygen.

In particular, methods of preparation of silver vanadium oxide composite material for use as cathode active material in a cathode, and an electrochemical cell incorporating the cathode according to the present invention, are illustrated further by the following example.

EXAMPLE I

A cathode was formed from silver vanadium oxide prepared by intimate contact of the silver containing component with the vanadium containing compound in the following manner. A 1:1 molar mix of elemental Ag(0) powder and $V_2O_5$ was heated in a sealed borosilicate tube at 600° C. for 24 hours to form silver vanadium oxide according to the present invention. The silver vanadium oxide thus formed was mixed with carbon black and graphite as conductive diluents and polytetrafluoroethylene (PTFE) powder as a binder material to form a depolarizer which was pressed into cathodes for use in electrochemical cells. A cathode comprising 3% conductive materials, 3% PTFE and 94% silver vanadium oxide made according to the method of the present invention was thus prepared. A battery cell was assembled using the foregoing cathode, lithium as the anode, 1M $LiAsF_6$ in propylene carbonate and dimethoxyethane as the electrolyte and a microporous polypropylene sheet as a separator. The weight of the depolarizer used in the cathode was 0.5 g. The open circuit voltage of the cell was 3.45 V and the cell delivered 0.06 Ah or 0.12 Ah/g to a 2 V cut-off under a drain of 0.5 mA/$cm^2$. The shape of the discharge curve was stepped with a large plateau at about 2.5 volts.

The above detailed description and example are intended for the purposes of illustrating the invention and are not to be construed as limiting. For example, depending on the application of the electrochemical cell, the range of cathode compositions used can vary from 100% silver vanadium oxide to 80% silver vanadium oxide with 10% carbon/graphite and PTFE or other suitable conductor and binding materials known in the art.

The invention can be embodied otherwise without departing from the principles thereof, and such other embodiments are meant to come within the scope of the present invention as defined by the appended claims.

What is claimed is:

1. A method for preparing a cathode of an electrochemical cell, wherein the cathode contains as active material silver vanadium oxide prepared by a chemical addition, or reaction of starting materials, which comprises:
   a) combining the starting materials comprising elemental silver with at least one vanadium-containing compound to form an intimate combination of the starting materials comprising an anhydrous mixed metal oxide;
   b) thermally treating the anhydrous mixed metal oxide in an inert atmosphere to form an oxygen deficient silver vanadium oxide; and
   c) forming a cathode from the oxygen deficient silver vanadium oxide.

2. The method of claim 1 wherein the inert atmosphere is selected from one of the groups consisting of argon, nitrogen and helium.

3. The method of claim 1 wherein the vanadium-containing compound is selected from the group consisting of a vanadium oxide salt, silver vanadate, polyvanadic acid, vanadium pentoxide, and a combination thereof.

4. The method of claim 1 wherein thermal treatment comprises baking the mixed metal oxide bronze at a temperature of between about 300° C. to 600° C. for a time of between about 2 hours to 72 hours.

5. The method of claim 1 wherein the thermal treatment comprises baking the mixed metal oxide in a sealed tube.

6. The method of claim 1 wherein the cathode is comprised of from about 80 weight percent to about 99 weight percent silver vanadium oxide.

7. The method of claim 1 wherein the forming of a cathode of step c) further comprises the addition of binder and conductor materials.

8. The method of claim 7 wherein the cathode is comprised of 0 to 3 weight percent carbon, 0 to 3 weight percent of a fluoro-resin powder, and 94 to 100 weight percent silver vanadium oxide.

9. The method of claim 1 wherein the cathode is formed by pressing the oxygen deficient silver vanadium oxide into a desired shape.

10. The method of claim 9 wherein the pressing of the oxygen deficient silver vanadium oxide further comprises the dropwise addition of a liquid electrolyte.

11. A cathode comprising as an active material oxygen deficient silver vanadium oxide prepared by thermally treating an anhydrous mixed metal oxide according to the method of claim 1.

12. The cathode of claim 11 further comprising binder and conductor materials.

13. The cathode of claim 12 wherein the cathode comprises about 0 to 3 weight percent carbon, 0 to 3 weight percent of a fluoro-resin powder and 94 to 100 weight percent silver vanadium oxide.

14. A nonaqueous electrochemical cell comprising a cathode containing active material comprising an oxygen deficient silver vanadium oxide prepared by thermally treating a mixed metal oxide prepared from an anhydrous combination of elemental silver and a vanadium-containing compound according to claim 1, the cell further comprising an alkali metal anode and a nonaqueous electrolyte comprising a combination of an organic solvent and a lithium salt.

15. The electrochemical cell of claim 14 wherein the anode is comprised of lithium.

16. The method of claim 1 wherein the step of combining the starting materials is performed to provide a preselected shape in the electrical discharge characteristic of the electrochemical cell.

17. A method for preparing a cathode of an electrochemical cell, wherein the cathode contains as active material silver vanadium oxide prepared by a chemical addition or reaction of starting materials, which comprises:
   a) combining the starting materials comprising a silver-containing component with at least one vanadium-containing compound to form an intimate combination of the staring materials comprising an anhydrous mixed metal oxide;
   b) thermally treating the anhydrous mixed metal oxide in an inert atmosphere to form an oxygen deficient silver vanadium oxide; and
   c) forming a cathode from the oxygen deficient silver vanadium oxide, wherein the forming step includes the dropwise addition of a liquid electrolyte.

18. The method of claim 17 wherein the step of combining the starting materials is performed to provide a preselected shape in the electrical discharge characteristic of the electrochemical cell.

19. A cathode comprising as an active material oxygen deficient silver vanadium oxide prepared by thermally treating an anhydrous mixed metal oxide according to the method of claim 17.

20. A nonaqueous electrochemical cell comprising a cathode containing active material comprising an oxygen deficient silver vanadium oxide prepared by thermally treating a mixed metal oxide prepared from an anhydrous combination of elemental silver and a vanadium-containing compound according to claim 17, the cell further comprising an alkali metal anode and a nonaqueous electrolyte comprising a combination of an organic solvent and a lithium salt.

* * * * *